United States Patent [19]

Hawkins

[11] Patent Number: 5,675,089
[45] Date of Patent: Oct. 7, 1997

[54] PASSIVE STRAIN GAUGE

[75] Inventor: Gary F. Hawkins, Torrance, Calif.

[73] Assignee: The Aerospace Corporation, El Segundo, Calif.

[21] Appl. No.: 741,087

[22] Filed: Oct. 30, 1996

[51] Int. Cl.⁶ ............................................. G01B 17/00
[52] U.S. Cl. ........................................ 73/801; 73/786
[58] Field of Search ....................... 73/577, 587, 709, 73/762, 786, 787, 801, 862.52, 862.53, 764

[56] References Cited

U.S. PATENT DOCUMENTS

| | | | |
|---|---|---|---|
| 3,447,378 | 6/1969 | Danegan et al. | 73/801 |
| 3,774,443 | 11/1973 | Green et al. | 73/587 |
| 4,487,068 | 12/1984 | Hawkins | 73/587 |
| 4,918,993 | 4/1990 | Hughson | 73/801 |
| 4,932,264 | 6/1990 | Hawkins et al. | 73/762 |
| 5,379,644 | 1/1995 | Yamagida et al. | 73/787 |
| 5,461,926 | 10/1995 | Bobb et al. | 73/770 |
| 5,461,927 | 10/1995 | Bobb et al. | 73/770 |

*Primary Examiner*—Ronald L. Biegel
*Attorney, Agent, or Firm*—Derrick Michael Reid

[57] ABSTRACT

A passive strain gauge of brittle carbon fibers are aligned along an elongated length and encapsulated in an epoxy matrix to emit acoustic emissions when under stress exerted along the length of the gauge. The gauge can be mounted onto and along a mounted direction upon a structure in line with the carbon fibers which retain a state indicating peak stress along the mounted direction. When removed from the structure, the gauge can be monitored during stress testing by applying an increasing load along the length to determine the amount of peak strain exerted upon the structure which is the strain when the gauge begins to emit acoustic emissions. The strain gauge is well suited for mounting to bridges and buildings which are likely to be subjected to stress events such as an earthquakes for determining the amount of stress exerted upon the structure during the stress inducing event.

7 Claims, 3 Drawing Sheets

Mounted Strain Gauge

Mounted Strain Gauge

Strain Gauge Test System

Strain Gauge Acoustic Response

PASSIVE STRAIN GAUGE

STATEMENT OF GOVERNMENT INTEREST

The invention was made with Government support under Contract No. FO4701-93-C-0094 by the Department of the Air Force. The Government has certain rights in the invention. The invention described herein may be manufactured and used by and for the government of the United States for governmental purpose without payment of royalty therefor.

FIELD OF THE INVENTION

The present invention relates to the field of structural strain detection. More specifically, the present invention relates to strain gauges and measuring systems.

BACKGROUND OF THE INVENTION

Acoustic emission technology have employed the Kaiser effect which is the name of the physical phenomena describing materials that emit acoustic signals only when stressed to a level higher than any previous stress applied to the material. The term acoustic emission refers to the noises materials make as they are stressed. As a material is stressed, cracks form to relieve local highly stressed portions of the material. These noises can be precisely detected with piezoelectric transducers mounted on the material under stress. Amplifiers and recording electronic equipment can precisely record the amount of stress exerted upon the material. The electronic apparatus measures the amount of acoustic signal emitted when the material is under stress. When the load or stress is reduced, the cracks close. If a load is then again applied, the cracks open again without substantive acoustic emission until the cracks open to point of the prior load, after which, the cracks open and lengthen as the homogeneous material again emits acoustic emissions. Virtually no acoustic emissions are present in the material until the load exceeds the prior load. The Kaiser effect has disadvantageously not been applied to strain gauges.

Strain detection systems have used electrical monitoring apparatus to detect the presence of strain induced into a material. An active strain gauge detection system includes an electrically powered active strain gauge which is bonded to a structure and electrically connected to monitoring equipment. Stress induced into the structure is concurrently induced into the bonded strain gauge. The electrical resistance of the homogeneous conductive material in the active strain gauge is measured as the stress is induced into the active strain gauge. The electrical resistance changes as stress is applied to provide electrical monitoring which is an electrical indication of the amount of strain. Such conventional active strain detection systems are not suitable for monitoring remote structures, such as bridges over vast tracks of unpopulated land, because of the required electrical connections to the electrical monitoring equipment at each monitored site. In the presence of a stress inducing event, such as an earthquake, fixed structures, such as building and bridges, may be stressed and structurally weakened. It may be difficult or impractical to determine the amount of stress induced in a structure after a stress inducing event by post event examination. Such weakened structures may require remedial actions such as destruction or reinforcement after the stress event, so that surviving structures remain safe to human habitation and use. Hence, there exists a need to provide cost effective measuring of stress events that would indicate if a structure has been subjected to stress exceeding predetermined safety limits.

Passive strain gauges which do not require active electronic monitoring by retaining a state indicating the amount of stress induced during a stress inducing event are desired for passive stress monitoring. Passive strain gauges are preferred for passive monitoring of remote structures because active electrical power with corresponding power distribution and monitoring equipment is not required at the remote site, yet may preserve a state of highest strain than can be determined well after a stress inducing event. One possible passive strain gauge is a magnetic strain gauge which reversibly changes its magnetic properties when stress to a state indicates the maximum amount of stress. The passive magnetic strain gauge may include a homogeneous rod of magnetic material bonded to a structure. Magnetic passive strain gauge are disadvantageously temperature sensitive and contain reversible magnetic materials which can be altered by exposure to unwanted magnetic fields well after a stress event and may thereby provide false indications of the peak amount of induced stress.

A desired passive strain gauge must be subjected to post stress event examination. Testing equipment is necessary to determine the state of the passive strain gauge, such as magnetic measuring equipment in the case of the passive magnetic strain gauge. The type of testing equipment desired is dependent upon the type of gauge. U.S. Pat. No. 4,932,264 discloses a technique for acoustic measuring of an impregnated fluid gauge which retains information about the highest pressure that has ever been exerted upon it. The pressure sensor uses microballoons and records peak hydrostatic pressure. Such a fluid retains pressure information long after the pressure event. The acoustic measuring technique provides a means of testing the fluid to determine the peak amount of pressure well after the pressure inducing event. Post event measurement and testing techniques are desirable for application to retentive passive strain gauge materials for detecting historic stress inducing events on structures. But such measurement and testing techniques have not been applied to reliable and precise passive strain gauges providing acoustical emissions. These and other disadvantages are solved or reduced using the present invention.

SUMMARY OF THE INVENTION

An object of this invention is to provide a strain gauge that retains a state representing past stress events.

Another object of this invention is to provide a system that determines the amount of stress that has been applied to the strain gauge.

Yet another object of the invention is to provide a strain gauge which can be mounted upon a structure and which retains a state representing past stress upon a structure.

Still another object of the invention is to provide a system that determines the amount of strain that has been applied to a strain gauge mounted upon a structure so as to determine the amount of stress or strain exerted upon the structure.

The invention covers a passive Kaiser effect strain gauge which when mounted upon a structure, passively retains a state which represents the amount of the peak strain experienced by that strain gauge and hence the peak strain induced in a structure upon which strain gauge is affixed. The strain gauge is rigidly mounted by suitable bonding means to the structure which, when under stress by a stress inducing event, induces a corresponding strain into the mounted strain gauge which retains the peak strain. When mounted to the structure, the passive strain gauge requires no electrical power nor monitoring when mounted to the structure which may be located in a remote site.

The passive strain gauge comprises a brittle material which emits acoustic emissions when under increasing strain exceeding prior strain levels. The passive strain gauge is preferably made of extremely brittle aligned strands which begin cracking at low strain values and continues to crack as stress is increasingly induced into the gauge. The use of strands provides for high sensitivity to the amount of induced stress. The amount of cracking of strands is highly correlated to the amount of induced strain for accurate sensitivity. The alignment of strands relative to placement on the structure is preferably used to indicates the relative direction of stresses induced into the structure. The passive strain gauge preferably includes brittle aligned strands running an elongated length of the gauge providing high sensitivity in a relative direction along the structure In the preferred form, the strain gauge is an epoxy matrix of aligned temperature-degraded brittle carbon fibers that emit acoustic emissions when under stress. The gauge is useful for passively monitoring loading conditions and stresses which may occur at any time upon a structure to which the gauge is affixed. Such loading conditions and stresses may be induced by a variety of stress inducing events, such as earthquakes. The gauge is bonded to the structure without the use of on-site electrical power, wiring or monitoring equipment.

During use, the strain gauge is firmly bonded to the structure under passive stress monitoring. The gauge is strained as the structure is strained. The gauge can be removed from the structure at any time well after a stress inducing event. When a measurement of the peak strain in the structure is desired, the gauge is carefully removed from the structure and mounted in a testing system. The test system induces an increasing test strain upon the gauge. As the induced test strain is increased, the gauge will begin to emit acoustic emissions at the point of peak strain that was experienced when the gauge was mounted to the structure. The test strain level detected upon the first occurrence of acoustic emissions is the strain level equal to the peak strain level the gauge had previously experienced while mounted to the structure. In this manner, the test system is used to determine the peak amount of strain exerted upon the structure. The test system can be deployed as a roving test system or can be permanently placed at a test facility. After a stress event, such as a wide area earthquake, mounted strain gauges from several structures subjected to the stress inducing event can be removed and tested to determine which structures were subjected to strain and the resulting strain so that remedial actions can be taken to reinforce or destroy highly stressed weakened structures which present potential hazards to human life and property. These and other advantages will become more apparent from the following detailed description of the preferred embodiment.

DETAILED DESCRIPTION OF THE PREFERRED EMBODIMENT

Figure 1:
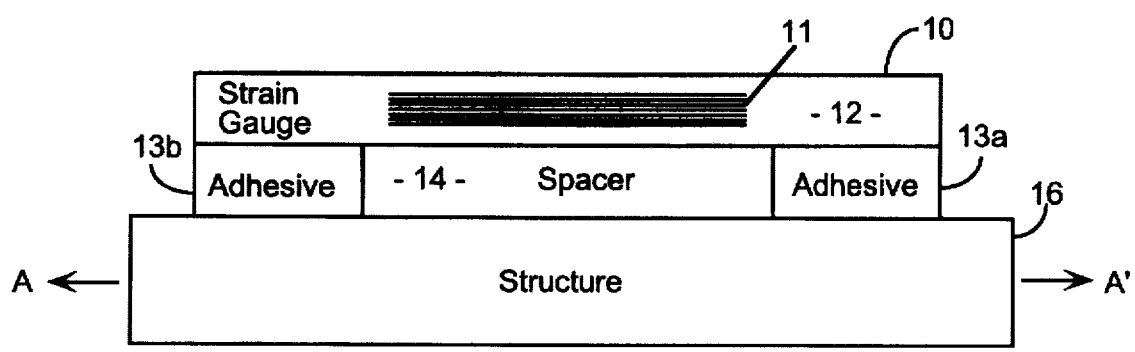
FIG. 1 is a diagram of a mounted strain gauge mounted to a structure.

An embodiment of the invention is described with reference to the figures using reference designations as shown in the figures. Referring to FIG. 1, the passive strain gauge 10 includes a brittle material such as strands 11 preferably encapsulated within a matrix 12. The strands 11 are acoustic emitters. The strands 11 are brittle materials which emit acoustic sound when under stress due to cracking or breakage. For example, brittle carbon fibers, ceramic strands or metal strands may be used as brittle acoustic emitters. The strands 11 are made of a brittle material which preserves a state of failure representing the peak tensile strain induced by past stress levels. No electrical apparatus is needed to sense the passive strain gauge 10 during monitoring because the level of cracking induced by the previous peak stress is preserved well after a stress inducing event. The strands 11 are preferably carbon fibers 11 aligned along an elongated length of the strain gauge 10. The fibers 10 are preferably degraded by heating them at 600 C in air to provide maximum detectable acoustic emissions when under stress. The matrix 12 is preferably a conventional room temperature curing epoxy. The matrix 12 is preferably a deformable material which when under stress does not emit acoustic emissions, so that any sensed acoustical emissions from the strain gauge can be attributed to the fibers 11. The carbon fibers 11 are preferably commercial fibers such as Amoco Performance Products P-100. The epoxy matrix is preferably commercial epoxy such as Fiberite 934.

Adhesives 13a and 13b and spacer 14 are used to rigidly bond the strain gauge 10 to a structure 16. The adhesives 13 typically create a space where the preferred spacer 14 may be disposed. The spacer may be deformable material such as a block of cured epoxy. The adhesive may be commercial adhesive such a Micromeasurements M-Bond 200. The spacer may be Duponts Teflon. The adhesives 13 securely mount the strain gauge 10 to the structure 16. The fibers 11 do not preferably extend the full length of the strain gauge 12 so that the gauge 10 may be removed from the structure 10 by cutting the matrix 12 between the end of the fibers 11 and the adhesive 13 so that fibers are removed from the structure 16 in tact without affecting the fibers 11 during removal. Various amounts of matrix material 12 can be used to match the thermal expansion of the strain gauge 10 to the structure 16. The typical negative thermal expansion of the fiber 11 can offset the positive thermal expansion of the matrix 12 to provide a thermal expansion match between the structure 16 and the gauge 10. The structure 16 may be a massive field structure such as an interstate highway bridge or a population center building. The strands 11 are aligned along the length of the gauge so that the adhesives 13 and spacer 14 rigidly secure the strain gauge 10 along a direction A-A' of the structure. The strain gauge 10 can then be used to passively measure the amount of stress induced into the structure 16 along the direction A-A'.

Figure 2:
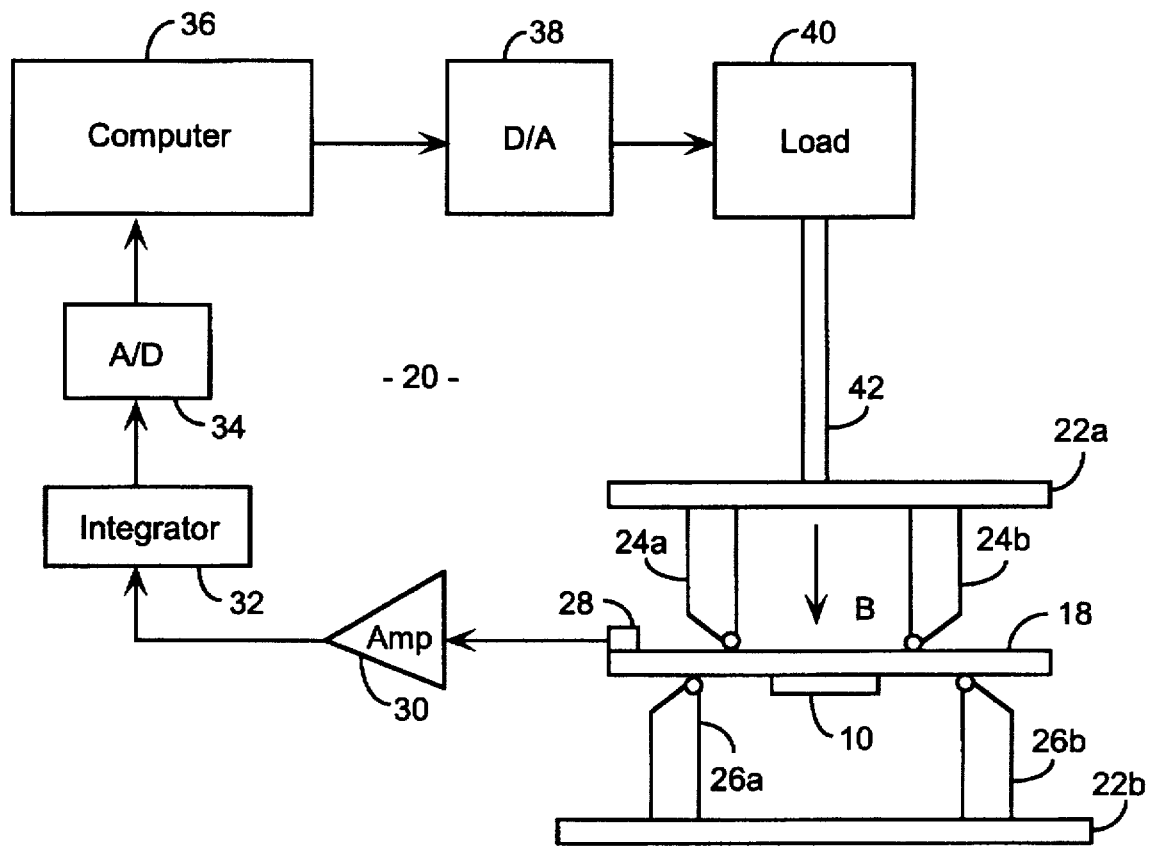
FIG. 2 is a diagram of a strain gauge test system.

Referring to FIG. 2, the gauge 10 may be mounted to an aluminum bar 10 for testing. Testing includes manufacturing testing, and structure testing. Sample strain gauges 10 may be secured or subsequently secured on aluminum bars 18 during manufacture, so that the gauge samples may be tested to determine precise relationships between acoustical emissions and exerted stresses. The fibers are typically in bundles of 2000 individual fibers of commercial fiber such as Amoco Performance Products P-100. Various numbers of fibers may be used to correlate stress loads. The possible number of fibers provide a wide range of failure strengths and acoustic emission levels correlated to stress loads. The number of fibers and degrading temperatures can be selected to provide good repeatability and sensitivity to respective stress loads.

A unidirectional composite gauge 10 preferably brittle aligned fibers 11 in the matrix 12. As the gauge is loaded by an external stress inducing load, the fibers fracture due to the external load along the line of aligned fibers. As the fibers are unloaded, the cracked fiber quietly relax back to fit together while not emitting detectable noise. As the load is increased another time, the weaker fibers that have already been broken do not emit acoustic emission but newly fracture fibers start to emit acoustic emission when the load exceeds the previous peak level. During many repeated stress events, there will always be only one peak value which will be recorded in the gauge as represented by an amount of fractured fibers.

The use of unidirectional fibers enables the gauge to be sensitive to loads only along the length of the gauge and therefor along the line length of the fibers. Load perpendicular to the fiber direction are reacted by the compliant matrix and do not cause cracking of the fibers. This unidirectional sensing is desirable when determining both the magnitude and the direction of the peak strain.

The test system includes a four point test applying pressure from two opposing top plates 22a and bottom 22b having plungers 24a and 24b, and 26a and 26b, respectively which apply a stress upon the aluminum bar 18 in the direction of C-C'. A transducer 28 is attached to the aluminum bar 18 to sense acoustic emission and transduce them into electrical signals which are amplified by an amplifier 30, and integrated by an integrator 32 to provide an analog signal which represents acoustic emissions. The analog signal is converted into digital form by an analog to digital converter 34 providing a digital signal to a computer 36. The computer 36 provides load signal to a digital to analog converter 38 for providing an analog drive signal to a load system 40 which exerts a load stress through a rod 42 attached to the top plate 22a. During testing, the computer 36 can provide an increasing load signal for applying an increasing load upon the bar 18, while monitoring the acoustic emission. The computer 18 can automatically determine load stress levels at Which the gauge 10 emits acoustic emissions. Commercial load system such as Instron Universal Testing Machine may be used.

Figure 3:
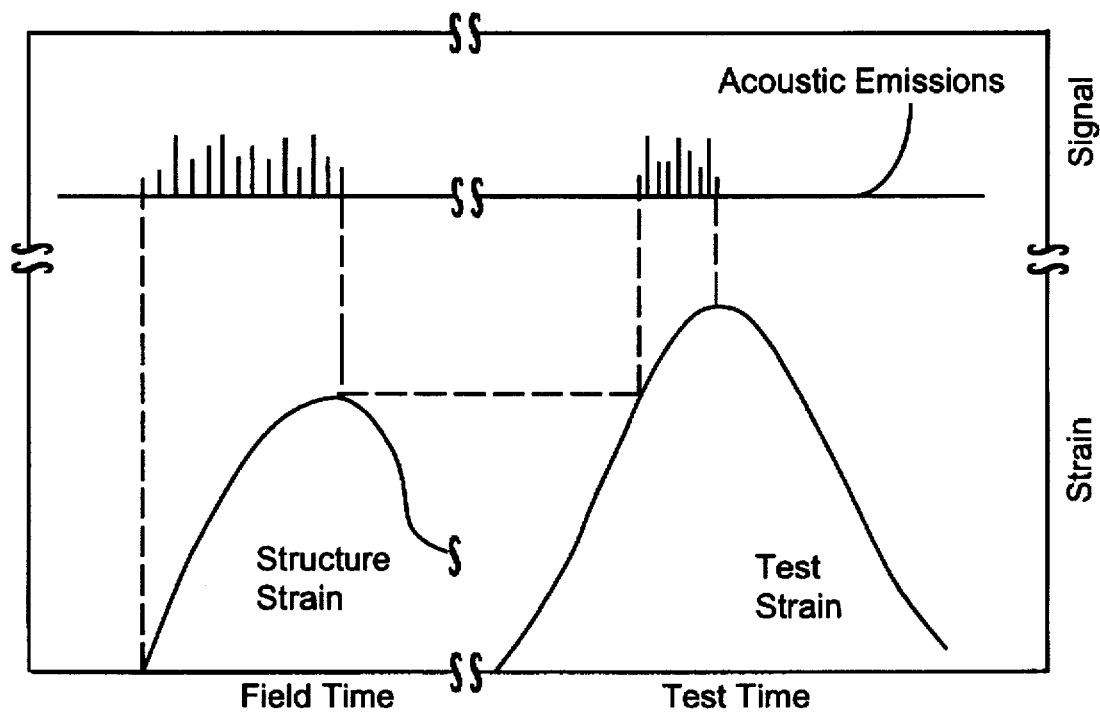
FIG. 3 depicts a strain gauge acoustic response of the strain gauge during both structural strain and test strain.

Referring to FIG. 3, when a gauge is in the field and mounted upon a structure, acoustic emissions occur as strains are applied. Structure stain is shown to increase to a peak value. As the structure strain increases, such as during a stress event, the gauge continues to emit acoustic emissions, but they are not recorded and unnecessary for the function of this device. During test time, the test load increases to increase stress upon the gauge. When the load stress increases to the peak stress level experienced in the field, then the gauge begins to emit acoustic emission signals. When the computer first detects acoustic emissions during testing, the corresponding strain equals the peak strain experienced in the field.

The invention covers an aligned acoustic mission strain gauge and a system for determining peak stress levels. Those skilled in the art can make enhancements, improvements and modifications to enhance the invention. However, those enhancements, improvements and modifications may nonetheless fall within the spirit and scope of the following claims.

What is claimed is:

1. The method of manufacturing a strain gauge for mounting to a structure for determining the peak stress exerted upon the structure, the method comprising the steps of, aligning acoustic emitters along a line for emitting acoustic emissions when stressed along the line, encapsulating the acoustic emitters within a matrix to form the strain gauge having length along the line of the acoustic emitters, the acoustic emitters preserves a state representing peak stress induced upon the acoustic emitters, the acoustic emitters emit acoustical emissions when stressed along the line above prior stresses along the length of the strain gauge, and adhering to ends of the strain gauge an adhesive means for bonding the strain gauge to the structure, the adhesive means also for creating a gap between the strain gauge and the structure between the ends of the strain gauge, and.

adhering to the strain gauge a deformable material in the gap, the deformable material extending the length of the line of the acoustic emitters.

2. The method of claim 1 wherein the encapsulating step, the matrix is a deformable epoxy cured to rigidly encapsulate the acoustic emitting means.

3. The method of claim 1 wherein the acoustic emitters are a bundle of carbon fibers.

4. The method of manufacturing a strain qauqe for mounting to a structure for determining the peak stress exerted upon the structure, the method comprising the steps of, aligning acoustic emitters along a line for emitting acoustic emissions when stressed along the line, the acoustic emitters are a bundle of carbon fibers, encapsulating the acoustic emitters within a matrix to form the strain gauge having length along the line of the acoustic emitters, the acoustic emitters preserves a state representing peak stress induced upon the acoustic emitters, the acoustic emitters emit acoustical emissions when stressed along the line above prior stresses along the length of the strain gauge, and degrading the bundle carbon fibers by heating.

5. A method for determining a stress exerted upon a structure, said method comprising the steps of, aligning acoustic emitters along a line for emitting acoustic emissions when stressed along the line, encapsulating the acoustic emitters within a matrix to form the strain gauge having length along the line of the acoustic emitters, the acoustic emitters preserves a state representing peak stress induced upon the acoustic emitters, the acoustic emitters emit acoustical emissions when stressed along the line when stressed above prior stresses along the length of the strain gauge, mounting the strain gauge on the structure, the length of the strain gauge in mounted direction relative to the structure, the stress exerted upon the structure along the mounted direction is induced along the line of the acoustical emitters, removing the strain gauge from the structure, applying a test load in increasing amount upon the strain gauge along the line of the acoustic emitters, and determining when the strain gauge begins to emit acoustical emissions when applying the test load in increasing amounts along the length to indicate the stress exerted upon the structure along the mounted direction.

6. The method of claim 4 wherein the structure is a bridge.

7. The method of claim 4 wherein said mounting step, the strain gauge is mounted to the structure using an adhesive.

* * * * *